(12) United States Patent
Flettner

(10) Patent No.: US 9,553,666 B2
(45) Date of Patent: *Jan. 24, 2017

(54) MEASURING SIGNAL TO NOISE RATIO OF A WDM OPTICAL SIGNAL

(71) Applicant: JDSU Deutschland GMBH, Eningen (DE)

(72) Inventor: Axel Flettner, Bondorf (DE)

(73) Assignee: VIAVI SOLUTIONS DEUTSCHLAND GMBH, Eningen Unter Achalm (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/718,614

(22) Filed: May 21, 2015

(65) Prior Publication Data

US 2015/0256254 A1 Sep. 10, 2015

Related U.S. Application Data

(63) Continuation of application No. 14/094,068, filed on Dec. 2, 2013, now Pat. No. 9,042,724.

(60) Provisional application No. 61/733,338, filed on Dec. 4, 2012.

(51) Int. Cl.
| | |
|---|---|
| *H04B 10/08* | (2006.01) |
| *H04B 10/079* | (2013.01) |
| *H04J 14/02* | (2006.01) |
| *H04J 14/06* | (2006.01) |

(52) U.S. Cl.
CPC ..... *H04B 10/07953* (2013.01); *H04J 14/0227* (2013.01); *H04J 14/06* (2013.01)

(58) Field of Classification Search
CPC .. H04B 10/07953; H04J 14/0227; H04J 14/06
See application file for complete search history.

(56) References Cited

U.S. PATENT DOCUMENTS

| | | |
|---|---|---|
| 7,218,436 B2 | 5/2007 | Yao |
| 7,257,324 B2 | 8/2007 | Chung et al. |
| 7,391,977 B2 | 6/2008 | Yao |
| 8,000,610 B2 | 8/2011 | Yao |

(Continued)

FOREIGN PATENT DOCUMENTS

EP          2136485          12/2009

OTHER PUBLICATIONS

Floridia et al. "Fast on-line OSNR measurements based on polarization-nulling method with downhill simplex algorithm" Electronic Letters, The Institution of engineering and Technology, vol. 44, No. 5, Jul. 17, 2008.

(Continued)

*Primary Examiner* — Dzung Tran
(74) *Attorney, Agent, or Firm* — Mannava & Kang, P.C.

(57) ABSTRACT

A device for measuring optical signal-to-noise ratio (OSNR) of a wavelength division multiplexing (WDM) optical signal including multiple wavelength channels may include a tunable optical filter to select an optical wavelength channel of the plurality of optical wavelength channels. The device may also include a polarization controller to adjust a polarization state of the selected optical wavelength channel, and a control unit to compute the OSNR of the selected wavelength channel based on a target control point.

15 Claims, 9 Drawing Sheets

(56) References Cited

U.S. PATENT DOCUMENTS

| | | | |
|---|---|---|---|
| 9,042,724 B2* | 5/2015 | Flettner | H04B 10/07953 398/26 |
| 2004/0114923 A1* | 6/2004 | Chung | H04B 10/07955 398/26 |
| 2005/0117915 A1 | 6/2005 | Miyazaki | |
| 2005/0175339 A1 | 8/2005 | Herskowits et al. | |
| 2005/0201751 A1 | 9/2005 | Yao | |
| 2006/0115199 A1 | 6/2006 | Yao | |
| 2007/0274728 A1* | 11/2007 | Bergano | H04B 10/2563 398/152 |
| 2009/0316153 A1* | 12/2009 | Heismann | H04B 10/07953 356/364 |
| 2010/0239245 A1 | 9/2010 | Yao | |
| 2012/0219285 A1 | 8/2012 | Dahan et al. | |
| 2012/0293804 A1 | 11/2012 | Guo et al. | |

OTHER PUBLICATIONS

Floridia et al. "High accuracy and fast acquisition time of polarization nulling-based OSNR monitor" Electronic Letters, The Institution of engineering and Technology, vol. 46, No. 2, Jan. 21, 2010.
EP Search Report for EP Appln No. 13195633, Apr. 7, 2014.

* cited by examiner

MEASURING SIGNAL TO NOISE RATIO OF A WDM OPTICAL SIGNAL

CROSS-REFERENCE TO RELATED APPLICATIONS

The present invention is a continuation of U.S. patent application Ser. No. 14/094,068 which claims priority from U.S. Patent Application No. 61/733,338 filed Dec. 4, 2012, which is incorporated herein by reference.

TECHNICAL FIELD

The present invention relates to optical networking equipment, and in particular to devices and methods for measuring optical signal to noise ratio of a wavelength division multiplexed optical signal.

BACKGROUND OF THE INVENTION

In a wavelength division multiplexing (WDM) optical transmission system, optical signals at a plurality of wavelengths are encoded with digital streams of information. These encoded optical signals, or "wavelength channels", are combined together and transmitted through a series of spans of optical fiber in a WDM fiberoptic network. At a receiver end of a transmission link, the wavelength channels can be separated, whereby each wavelength channel is individually detected by an optical receiver.

While propagating through an optical fiber, light gets attenuated via absorption and scattering. Yet some minimal level of optical power is required at the receiver end to decode information that has been encoded in a wavelength channel at the transmitter end. To boost optical signals propagating in an optical fiber, optical amplifiers are deployed at multiple locations, known as nodes, throughout the transmission link. Optical amplifiers extend the maximum possible length of the link, in some instances, from a few hundred kilometers to several thousand kilometers, by amplifying optical signals to power levels close to the original levels of optical power at the transmitter end.

Even when amplified to original power levels, WDM optical signals cannot be restored to their original condition, because optical amplifiers add in-band noise to the signal. The optical noise effectively limits a maximum length of the transmission link, and therefore needs to be tightly controlled and measured.

One straightforward method to measure in-band signal-to-noise ratio (SNR) is to convert optical signal to electrical signal and to measure the SNR by demodulating the electrical signal. However, the straightforward SNR measurement requires costly electronic equipment. Thus, measuring SNR in optical domain (so-called "optical SNR" or OSNR) is highly desirable.

OSNR can be evaluated by scanning the spectrum of the WDM optical signal, detecting wavelength channels which reveal themselves as spectral peaks in the WDM optical signal, and evaluating ratio of peaks to valleys in the spectrum. This method, however, is inherently imprecise, because it assumes that optical noise in the valleys between the wavelength channels is the same as in the in-band optical noise. It is not uncommon that in-band noise is actually much higher than out-of-band noise.

A more precise method relies on a difference between polarization properties of wavelength channels and optical noise. The WDM signal light is generated by laser diodes, which emit polarized light. Upon optical amplification, the light polarization is generally preserved. As a result, a degree of polarization of the wavelength channels is high (when polarization mode dispersion (PMD) is low enough). On the other hand, optical noise remains unpolarized. This is because optical noise in optical fiber amplifiers originates from randomly polarized spontaneous emission of light in optically inversed gain medium, which is amplified by the same gain medium that emitted it. A high degree of polarization of the useful optical signal and lack of polarization in the optical noise allows one to suppress wavelength channels one by one using polarization nulling methods, and directly measure the remaining optical noise. The measurement is repeated for each wavelength channel of interest.

Chung et al. in US Patent Application Publication 2004/0114923 disclose an OSNR monitoring system including a polarization controller coupled to a linear polarizer and a tunable optical bandpass filter. The tunable optical bandpass filter is tuned to a wavelength channel of interest. Since the polarization state of the wavelength channels is not known, the polarization controller scans the polarization within a predetermined range, and a minimum value is searched for. When the polarization direction of the optical signal at the output of the polarization controller is orthogonal to the polarization transmission direction of the polarizer, the transmitted optical power is at minimum, being equal to one half of the optical noise power. Once the optical noise power is known, the OSNR can be calculated.

Yao in U.S. Pat. Nos. 7,218,436; 7,391,977; and 8,000,610 discloses a system for measuring OSNR by either scrambling polarization of WDM optical signal, or by systematically varying through all possible states of polarization, and detecting maximum and minimum optical power levels at a photodetector disposed downstream of an optical polarizer. The system of Yao also includes a tunable optical filter for selecting individual wavelength channels of the WDM optical signal.

Detrimentally, the OSNR measuring systems of Chung and Yao rely on scanning a polarization controller through all polarization states to find a particular setting of the polarization controller, at which the optical signal from a particular wavelength channel is suppressed. Due to a great multitude of possible polarization states of a polarization controller, such scanning can take an impractically long time. Polarization scrambling, that is, quickly and randomly changing polarization of the WDM optical signal, can be used in an attempt to shorten the scanning time at each wavelength. However, polarization scrambling does not guarantee that the required polarization state is always achieved, thus reducing fidelity of OSNR measurements.

Chung et al. in U.S. Pat. No. 7,257,324 disclose an OSNR monitoring apparatus including a polarization controller coupled to a polarization-selective optical delay line, for imparting a controllable amount of a differential group delay (DGD) to the modulated optical signal. A fast photodetector is coupled to the polarization-selective optical delay line for measuring DC and AC components of the modulated optical signal. At a certain pre-defined amount of DGD imparted to the optical signal, the DC component becomes proportional to a magnitude of the wavelength channel signal, while the AC component is proportional to the optical noise. Thus, by measuring ratio of DC electrical signal to AC electrical signal at the photodetector output, OSNR can be estimated.

Detrimentally, the apparatus of Chung et al. in U.S. Pat. No. 7,257,324 requires rather complex electronics for processing high-frequency electrical signals. Furthermore, the optimal delay has to be found in advance before proper calculations can be carried out, the signal has to be stable in time, and non-linear effects must not degrade the spectral characteristic of the signal to be measured.

SUMMARY OF THE INVENTION

The inventor has discovered that a WDM optical signal transmitted through a tunable optical filter can be polarization-nulled in real time during a scan of the optical spectrum of the WDM optical signal by the tunable optical filter. To track the constantly changing state of polarization of the transmitted optical signal, the polarization nulling is preferably performed using a heuristic multipoint extrema search, such as Nelder-Mead search. A plurality of checkpoints can be included in the search to verify the progress and to improve the overall robustness of the real-time polarization nulling. When the polarization nulling time is much smaller than the spectrum scanning time, for example one thousand to one hundred thousand times smaller, the OSNR of every WDM channel can be measured in a single sweep of the optical spectrum.

In accordance with the invention, there is provided a device for measuring OSNR of a WDM optical signal including a plurality of wavelength channels, the device comprising:
an input port;
an optical train coupled to the input port and including serially connected:
a tunable optical filter for selecting a wavelength channel of the plurality of wavelength channels,
a polarization controller for adjusting a polarization state of the selected wavelength channel,
a polarization selector disposed in the optical train downstream of the polarization controller, for selecting a polarization state of the selected wavelength channel, and
a photodetector disposed in the optical train downstream of the tunable optical filter, the polarization controller, and the polarization selector, for detecting a first optical power level of the selected wavelength channel and in the selected polarization state; and
a control unit coupled to the tunable optical filter, the polarization controller, and the photodetector, and configured to tune the optical filter to the selected wavelength channel; adjust the polarization controller to reach a target control point, at which the first optical power level is minimized or reduced; and compute the OSNR of the selected wavelength channel from a polarization extinction defined as a ratio of a second optical power level upstream the polarization selector to the first optical power level;
wherein the control unit includes a computer processor and a non-transitory memory configured for causing the computer processor to perform a heuristic iterative search of the target control point by performing a plurality of iterations including a first iteration and a second iteration after the first, wherein a plurality of control points of the second iteration are selected based on optical power levels detected by the photodetector at a plurality of control points of the first iteration.

In one embodiment, the control unit is configured to continuously scan the tunable optical filter, while continuously adjusting the polarization controller to reach the target control point for each wavelength channel. Preferably, the heuristic iterative search includes a Nelder-Mead search, wherein the plurality of control points of the first and second iterations form first and second Nelder-Mead simplexes, respectively, in a parameter space of the polarization controller.

In accordance with the invention, there is further provided a method for measuring OSNR of a WDM optical signal including a plurality of wavelength channels, the method comprising:
(a) coupling the WDM optical signal to an optical train including serially connected:
a tunable optical filter for selecting a wavelength channel of the plurality of wavelength channels,
a polarization controller for adjusting a polarization state of the selected wavelength channel,
a polarization selector disposed in the optical train downstream of the polarization controller, for selecting a polarization state of the selected wavelength channel, and
a photodetector disposed in the optical train downstream of the tunable optical filter, the polarization controller, and the polarization selector, for detecting a first optical power level of the selected wavelength channel and in the selected polarization state;
(b) tuning the optical filter to the selected wavelength channel;
(c) adjusting the polarization controller to reach a target control point at which the first optical power level is minimized or reduced; and
(d) computing the OSNR of the selected wavelength channel from a polarization extinction defined as a ratio of a second optical power level upstream the polarization selector to the first optical power level;
wherein step (c) includes using a control unit to automatically perform a heuristic iterative search of the target control point, by performing a plurality of iterations including a first iteration and a second iteration after the first, wherein a plurality of control points of the second iteration are selected based on optical power levels detected by the photodetector at a plurality of control points of the first iteration.

In one embodiment, step (b) includes continuously scanning the tunable optical filter, and step (c) includes continuously adjusting the polarization controller to reach the target control point for each wavelength channel. Preferably, the heuristic iterative search of step (c) comprises a Nelder-Mead search, wherein the plurality of control points of the first and second iterations form Nelder-Mead simplexes in a parameter space of the polarization controller.

In accordance with another aspect of the invention, there is further provided a device for measuring OSNR of a WDM optical signal including a plurality of wavelength channels, the device comprising:
an input port;
a tunable optical filter coupled to the input port, for selecting a wavelength channel of the plurality of wavelength channels;
a polarization controller coupled to the tunable optical filter, for adjusting a polarization state of the selected wavelength channel;
a polarization selector coupled to the polarization controller, for selecting a polarization state of the selected wavelength channel;
a photodetector assembly coupled to the polarization selector, for detecting first and second optical power levels of the selected wavelength channel upstream and downstream of the polarization selector, respectively; and
a control unit coupled to the tunable optical filter, the polarization controller, and the photodetector, and configured to tune the optical filter to the selected wavelength channel; adjust the polarization controller to reach a target control point at which the first optical power level is reduced or minimized; and compute the OSNR of the selected wavelength channel from a polarization extinction defined as a ratio of the second optical power level to the first;

wherein the control unit includes a computer processor and a non-transitory memory configured for scanning the tunable optical filter across the wavelength channels of the WDM optical signal, while causing the computer processor to continuously perform an iterative search of the target control point for evaluating the OSNR of each one of the wavelength channels.

BRIEF DESCRIPTION OF THE DRAWINGS

Exemplary embodiments will now be described in conjunction with the drawings, in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1:
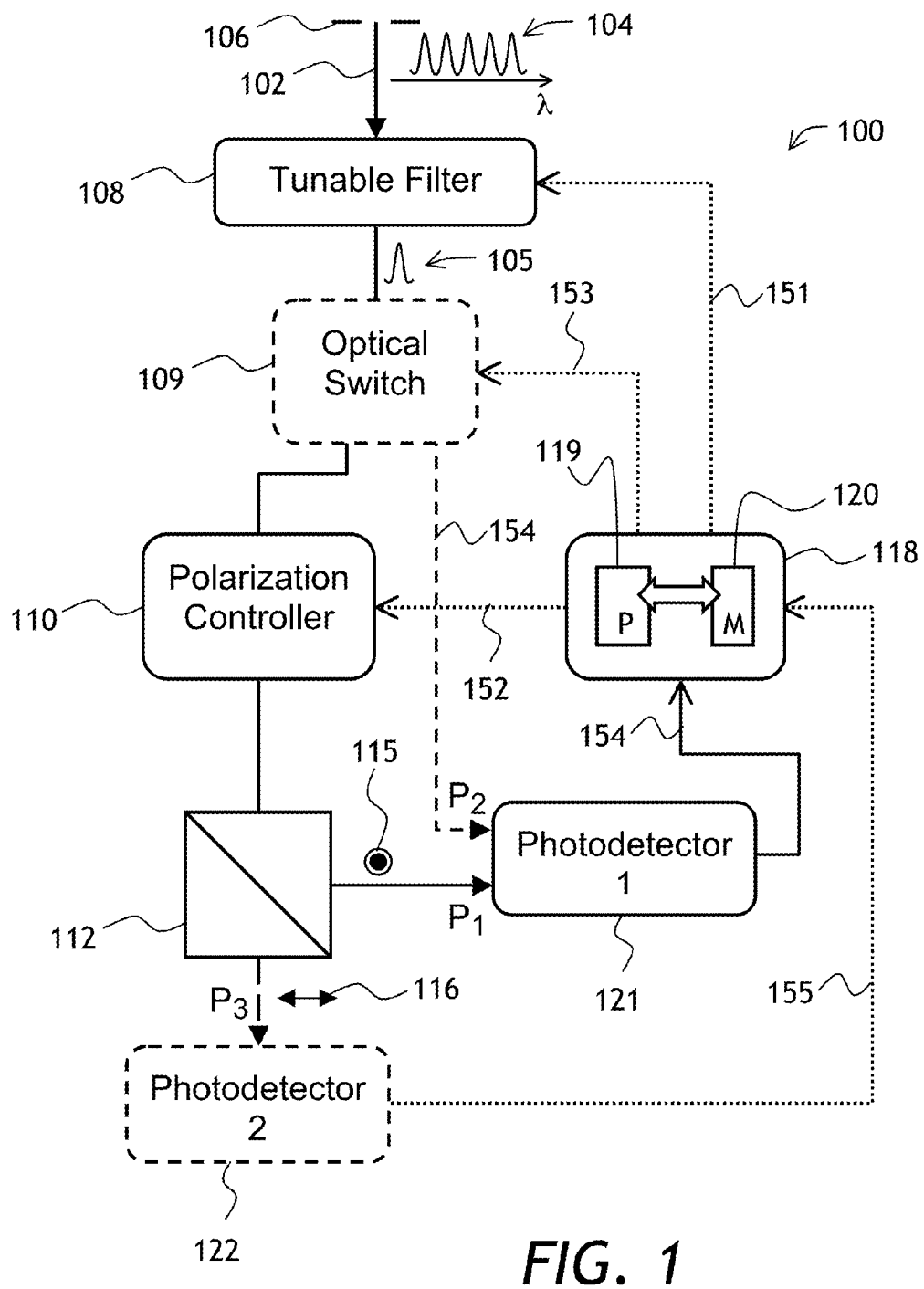
FIG. 1 is a block diagram of a device for measuring OSNR according to the invention.

Referring to FIG. 1, a device 100 for measuring OSNR of a WDM optical signal 102 including a plurality of wavelength channels 104 is shown. The device 100 includes an input port 106, a tunable optical filter 108 for selecting a wavelength channel 105 of the plurality of wavelength channels 104, a polarization controller 110 for adjusting a polarization state of the selected wavelength channel 105, a polarization beam splitter (PBS) 112 coupled to the polarization controller 110, for selecting a polarization state 115 of the selected wavelength channel 105, and a first photodetector 121 coupled to the PBS 112, for detecting a first optical power level $P_1$ of the selected wavelength channel 105 in the selected polarization state 115. An optional optical switch 109 can be coupled between the tunable filter 108 and the polarization controller 110 to allow the selected wavelength channel 105 bypass the polarization controller 110 and the PBS 112, to measure a second optical power level $P_2$ upstream of the PBS 112. Alternatively, a second photodetector 122 can be coupled to the PBS 112 to detect a third power level $P_3$ of the selected wavelength channel 105 in a polarization state 116 orthogonal to the selected polarization state 115. A control unit 118 is coupled to the tunable optical filter 108, the optional optical switch 109, the polarization controller 110, and the photodetector 121. The control unit 118 includes a computer processor 119 and a non-transitory memory 120.

In operation, the control unit 118 sends a filter control signal 151 causing the tunable optical filter 108 to select the wavelength channel 105, while suppressing all other wavelength channels 104 of the WDM optical signal 102. The selected wavelength channel 105 passes through the optical switch 109, which forwards it to the polarization controller 110. The polarization controller 110 transforms an input polarization state of the selected wavelength channel 105 into another state of polarization in dependence on a polarization control signal 152 from the control unit 118.

The control unit 118 is configured to adjust the polarization controller 110 by sending the polarization control signal 152 to reach a target control point, at which the first optical power level $P_1$ is minimized or reduced. The control unit 118 can be configured to send a switch control signal 153 causing the optical switch 109 to direct the wavelength channel 105 upstream of the PBS 112 and the polarization controller 110 to the first photodetector 121, as shown with a dashed line 154, to measure the second optical power level $P_2$. Then, the control unit 118 computes the OSNR of the selected wavelength channel 105 from a polarization extinction $PE=P_2/P_1$ using formulas and relationships known to a person of skill in the art. Neglecting optical losses, one can assume that $P_2=P_1+P_3$. Therefore, one can measure $P_3$ using the second photodetector 122 instead of measuring $P_2$ by switching the optical switch 109, and calculate the PE using an modified formula $PE=(P_1+P_3)/P_1$. In this embodiment, the control unit 118 receives a third optical power level signal 155 from the second photodetector 122 representing the third optical power level $P_3$.

According to the invention, the non-transitory memory 120 contains instructions for the computer processor 119 to cause the computer processor 119 to perform a heuristic iterative search of the target control point. Heuristic searches are preferable over gradient-based searches, because the latter can be trapped in local minima and/or misguided by measurement noise. A heuristic search performs a plurality of iterations based on previously measured optical power levels at various heuristically selected "control points" of the polarization controller 110. By way of a clarifying example, the search can include a first iteration and a second iteration after the first. A plurality of control points of the second iteration are heuristically selected based on optical power levels detected by the first photodetector 121 at a plurality of control points of the first iteration. Specific examples of heuristic searches will be provided further below.

Figure 2:
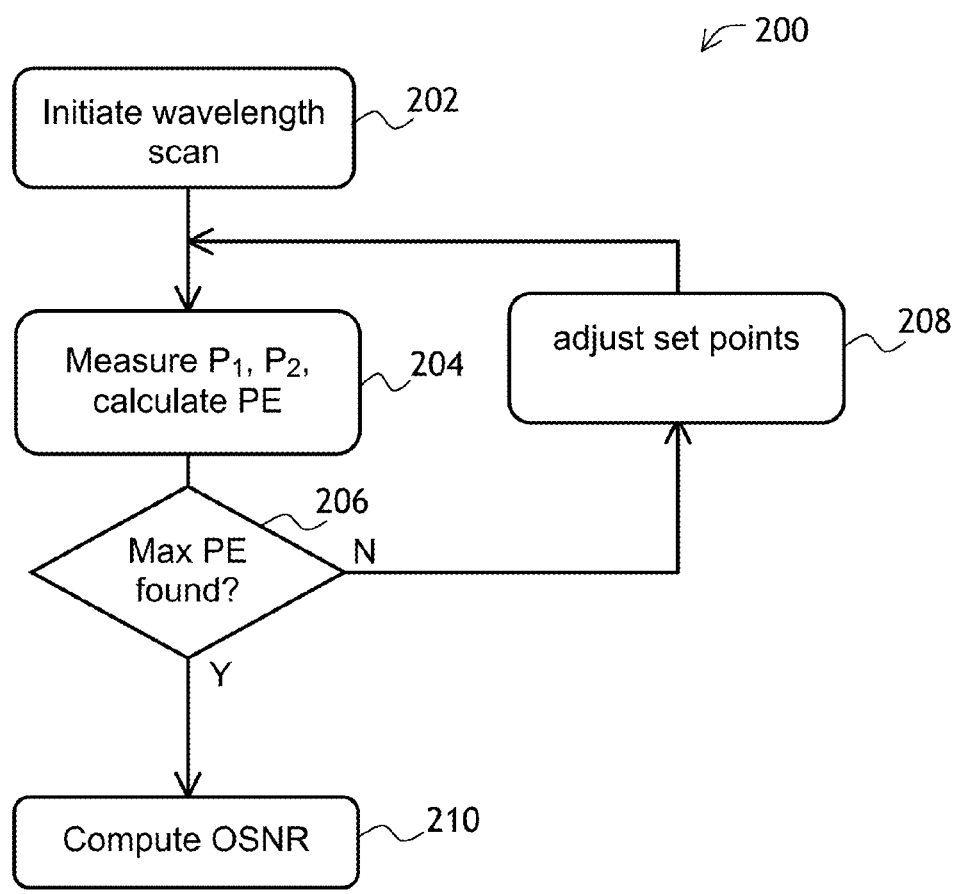
FIG. 2 is a flow chart of a general method of measuring OSNR using the device of FIG. 1.

A generic iterative search method 200 of the target control point is illustrated in FIG. 2. In a step 202 of the method 200, initial control points are selected, and the wavelength scan by the tunable optical filter 108 is initiated. During the first iteration, in a step 204, the first $P_1$ and second $P_2$ optical power levels are measured for each initial control point, and the polarization extinction PE is optionally computed for each initial point. In a step 206, a check is performed whether maximum PE or a minimum first optical power level $P_1$ is found. If not, the set points are adjusted in a step 208 according to a specific search method used. Then, during the second iteration, the first $P_1$ and second $P_2$ optical power levels are re-measured in the step 204 for each modified control point. The process repeats until the first optical power level $P_1$ is minimized or at least lessened to a pre-defined level, thus maximizing the polarization extinction PE. The second optical power level $P_2$ can be measured only once, because the optical power of the selected wavelength channel 105 usually does not change appreciably during one cycle of the search 200. Once the polarization extinction PE is maximized, the OSNR is computed in a step 210.

Figure 3A:
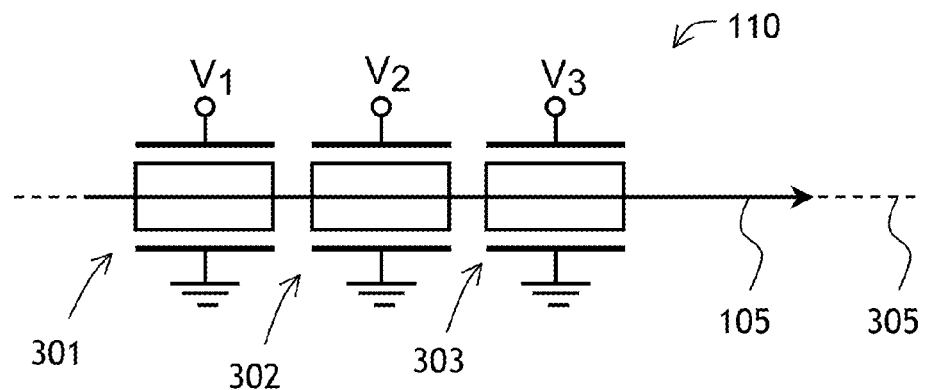
FIG. 3A is a schematic view of a three-stage polarization controller.

Referring to FIG. 3A, the polarization controller 110 includes at least two independent optical phase shifters, which may be controlled by voltage, current, or any other suitable means. For fast operation, the polarization controller 110 preferably includes three Pockels cell stages 301, 302, and 303 operated as voltage-variable optical phase shifter.

Figure 3B:
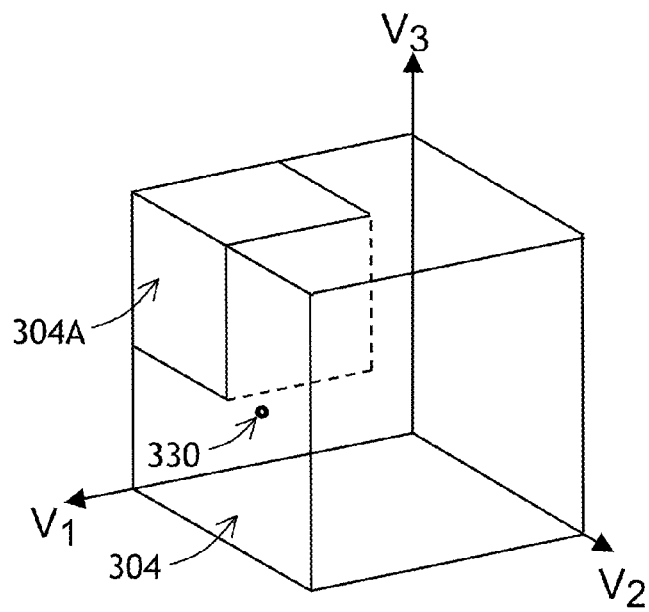
FIG. 3B is a view of a three-dimensional parameter space of the polarization controller of FIG. 3A.

In operation, the selected wavelength channel 105 propagates through the Pockels cell stages 301 to 303 in sequence. The Pockels cell stages 301 to 303 are rotated about an optical axis 305 at various angles, to ensure a complete coverage of the Poincaré-sphere while transforming an input state of polarization (SOP) to a desired output SOP. The rotation of the Pockels cell stages 301 to 303 is not shown in FIG. 3A for simplicity. Referring to FIG. 3B, voltages $V_1$, $V_2$, and $V_3$ applied to the Pockels cell stages 301, 302, and 303, respectively, form a three-dimensional parameter space 304. The target control point corresponding to the minimum first optical power level $P_1$ is sought in the parameter space 304 of the polarization controller 110. In FIG. 3B, the target control point is shown symbolically at 330.

Figure 3C:
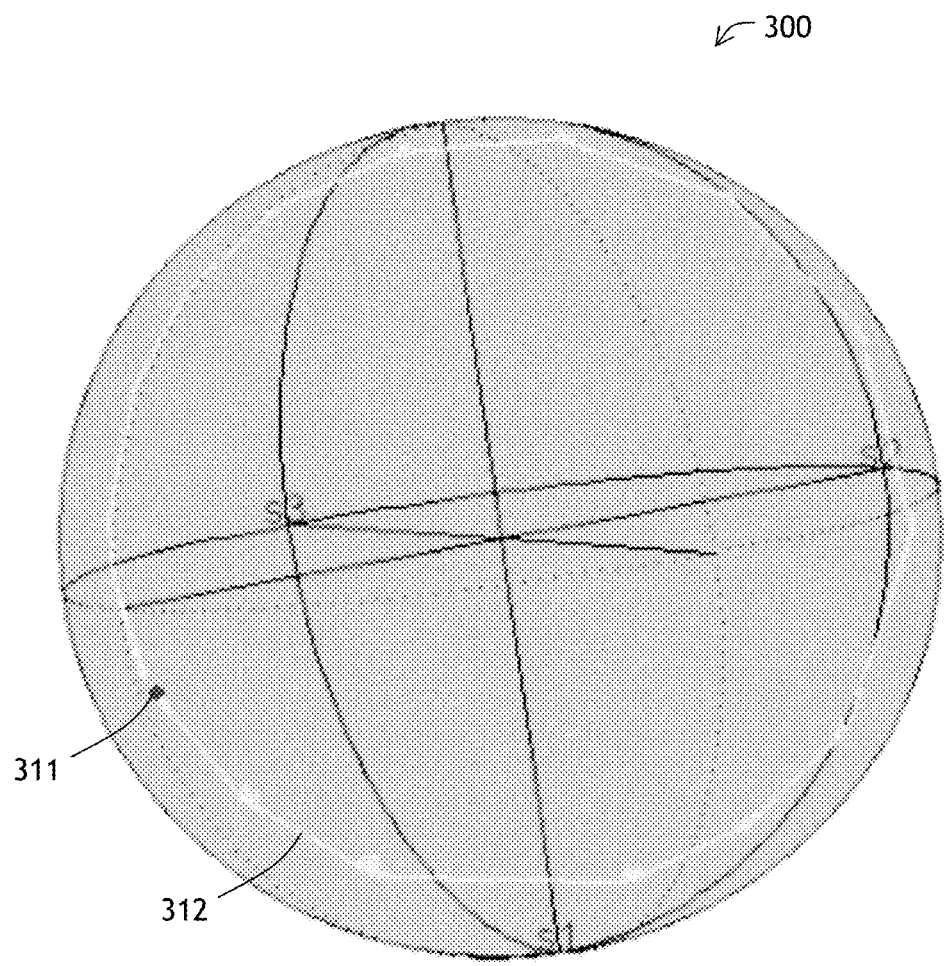
FIG. 3C is a view of Poincare sphere illustrating operation of the polarization controller of FIG. 3A.

Turning to FIG. 3C with further reference to FIGS. 1, 2, and FIG. 3B, a Poincare sphere 300 illustrates operation of the polarization controller 110. Principal points S1, S2, and S3 denote left circular, vertical linear, and 45 degrees linear polarizations, respectively, corresponding to a coordinate-system of the representation of Stokes-vectors. Applying the first voltage $V_1$ to the first stage 301 causes an initial polarization state 311 to travel on a circular trajectory 312 on the Poincare sphere 300. Similarly, applying the second $V_2$ and the third $V_3$ voltages causes the initial polarization state 311 to travel on different trajectories, not shown, at different angles on the Poincare sphere 300. Together, the three voltages $V_1$ to $V_3$ allow transformation of any initial polarization state into any other polarization state, preferably vertical or horizontal linear polarization for use with the PBS 112 of FIG. 1, although it is not necessary, because other type polarization "selectors" can be used in place of the PBS 12. Herein, the term "polarization selector" is used to denote a device that selects one of two orthogonal polarizations to send to the first photodetector 121, and to block or redirect the second, orthogonal polarization to the second photodetector 122. The polarization may be, for example, linear or circular. Preferably, the control unit 118 is configured, e.g. via software or firmware stored on the non-transitory memory 120, to continuously scan the tunable optical filter 108, while continuously adjusting the polarization controller 110 to reach the target control point 330 in the parameter space 304 for each wavelength channel 105.

To be able to reach the target control point 330 for each wavelength channel 104 of the WDM optical signal 102 as the tunable optical filter 108 is scanned, the heuristic iterative search 200 should be able to perform at least the first and second iterations for each wavelength channel of the WDM optical signal 102 during a single scan of the tunable optical filter 108. As an illustrative example, when the tunable optical filter 108 is an optical spectrum analyzer scanning the entire spectrum of the WDM optical signal 102 in 40 seconds, the response time of the polarization controller 110 should be one millisecond or faster, to allow the polarization nulling to be 40 milliseconds or faster, that is, to allow at least 40 measurements for one iterative search of the target control point 330 in the parameter space 304, thus allowing the polarization nulling time to be 1000 times faster than a time of a single wavelength scan. Preferably, the response time of the polarization controller 110 is 10 microsecond or faster, to allow the polarization nulling to be 400 microseconds or faster, thus allowing the polarization nulling time to be 100,000 times faster than a time of a single wavelength scan.

A specific, non-limiting example of a heuristic iterative search of the target control point 330 according to the invention will now be presented. Referring to FIGS. 4A, 4B, and FIGS. 5A to 5D with further reference to FIG. 3B, a search method 400 (FIGS. 4A, 4B) uses a Nelder-Mead search 450. The method 400 includes an initialization step 402, in which a plurality of candidate starting control points for the Nelder-Mead search 450 are generated. To generate the candidate starting points, the cubic-shaped control space 304 can be broken into eight half-size cubic segments 304A (only one is shown in FIG. 3B for clarity), and taking eight candidate control points $x_1$ to $x_8$ to be at geometrical centers of the eight half-size cubes 304A. The points $x_1$ to $x_8$ are shown in FIGS. 5A and 5B. In a sorting step 404 (FIG. 4A), the polarization extinction PE is measured for each of the candidate control points $x_1$ to $x_8$. Then, the eight candidate control points $x_1$ to $x_8$ are sorted in the order of decreasing PE, and four highest-PE control points, e.g. $x_1$, $x_2$, $x_4$, and $x_6$, are selected to be corners of a Nelder-Mead starting simplex tetrahedron 501 (FIG. 5A). In a step 406, a distance is calculated between each of the selected control points $x_1$, $x_2$, $x_4$, and $x_6$ to their geometrical center. If the distance is smaller than a pre-defined threshold distance (a decision block 410), then, in a step 408 the control points are varied. In another embodiment, the distance between the selected points themselves is checked. In both cases, the pre-defined threshold distance is selected so that at least for the first iteration of the method 400, the control points do not need to be varied. The control points can be varied at later iterations, when the Nelder-Mead simplex becomes sufficiently small in size. The checking step 410 ensures a good set of starting points, increasing the chances of quick conversion of the Nelder-Mead search 450. In one embodiment, the pre-defined minimum distance is not a constant but depends upon a PE obtained during a previous iteration. The higher the PE of the previous iteration, the smaller the pre-defined minimum distance.

If the distance is larger than the threshold distance, then the Nelder-Mead search 450 begins. Although a generic Nelder-Mead search is known, steps 412 to 434 of the Nelder-Mead search 450 will be briefly considered. In a step 412, the "worst" point, that is, the point with the lowest PE, is reflected through a geometrical center of the opposing triangle. For example, the worst point $P_4$ is reflected through a triangle formed by the remaining points $x_1$, $x_2$, and $x_6$, as shown with a line 510 in FIG. 5A, and a measurement is taken at the reflected point $x_r$, corresponding to the point $R_1$ in FIG. 5A. Then, a check is performed whether PE at the reflected point $x_r$ is better (higher) than at the current "best" (i.e. the highest PE) point $x_b$. If not, then in a step 414, a check is performed whether PE at the reflected point $x_r$ is higher than at the current "second worst" (i.e. the second lowest PE) point $x_x$. If not, then in a step 416, a check is performed whether PE at the reflected point $x_r$ is higher than at the current "worst" (i.e. the lowest PE) point $x_s$. If not, then in a step 422, the reflected point $x_r$ becomes the worst point $x_s$.

If $PE(x_r) > PE(x_b)$, then in a step 418, an "extended" point $x_e$ of the Nelder-Mead search 450 is calculated, and PE at that point PE($x_e$) is measured. Then, in a step 424, a check is performed whether PE($x_e$)>PE($x_r$). If not, $x_r$ becomes the worst point in a step 426. If yes, $x_e$ becomes the worst point in a step 430.

After the step 422 of assigning $x_r$ as the worst point $x_s$, or if PE($x_r$)>PE($x_s$) in the step 416, a contraction point $x_k$ is calculated and PE at that point PE($x_k$) is measured in a step 420. Then, in a step 428, a check is performed if PE($x_k$) is larger than PE($x_s$) of the current worst point $x_s$. If no, then in a step 432, all points $x_1$ ($x_1$, $x_2$, $x_3$, etc.) are shrunk (middle of vector pointing from $x_1$ to $x_b$) in the parameter space, and the new values are used for further calculations. If yes, then in a step 434, the contraction point $x_k$ becomes the worst point $x_s$.

Figure 5A:
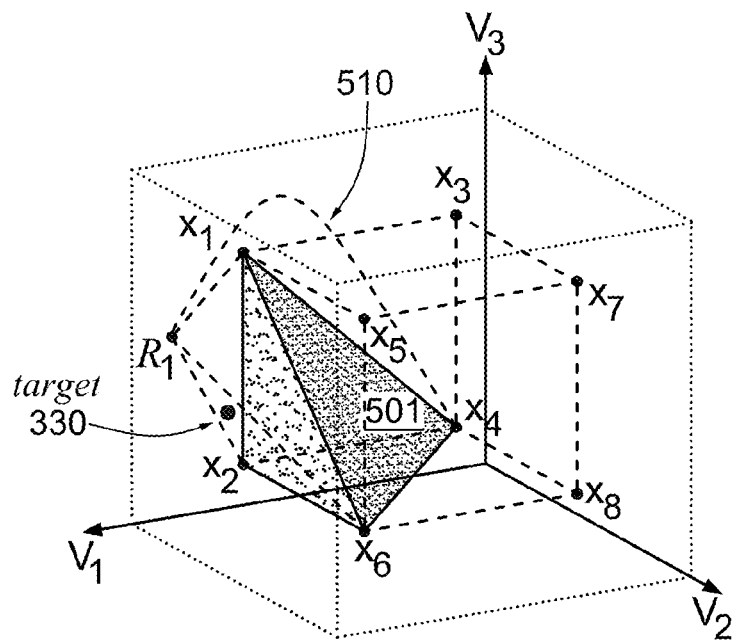
FIGS. 5A to 5D are three dimensional views of a parameter space of the polarization controller of FIG. 1, showing evolution of simplexes of the Nelder-Mead search.
Figure 5B:
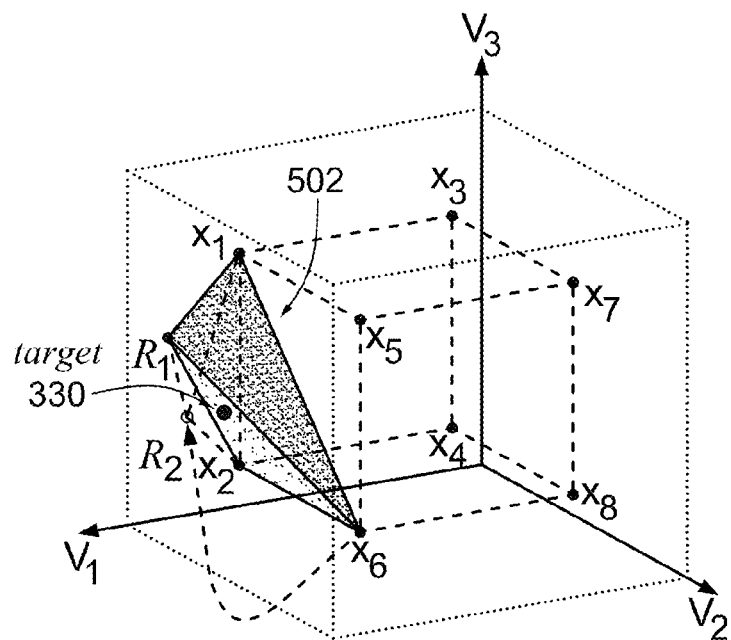
Figure 5C:
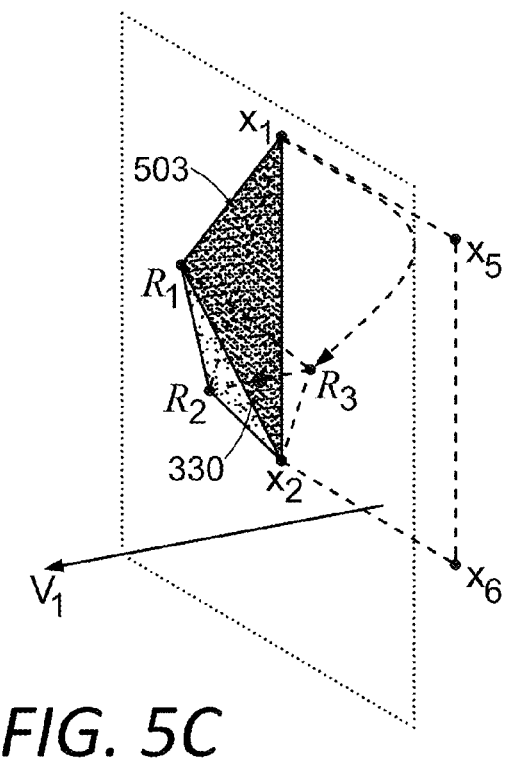
Figure 5D:
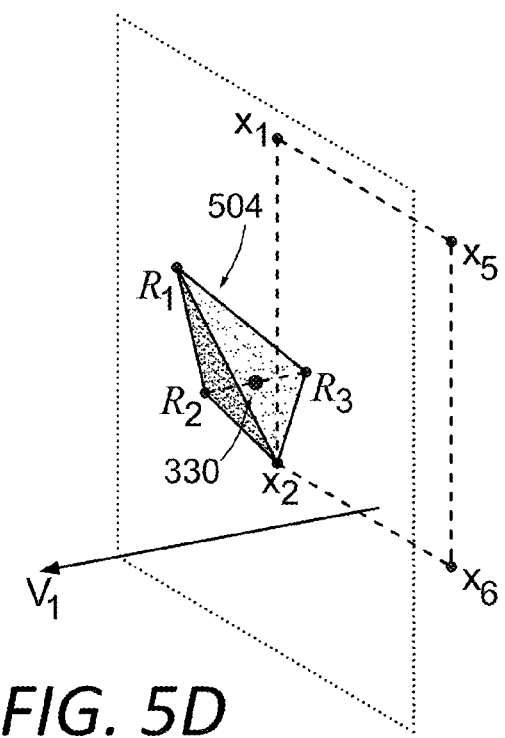

Steps 412 to 434 of the Nelder-Mead search 450 are repeated in subsequent iterations, resulting in a subsequent contraction of the Nelder-Mead simplex 501. For example, referring specifically to FIG. 5B, a second reflection point $R_2$ can be calculated by reflecting the point $x_6$ of a shrunk simplex tetrahedron 502 through a geometrical center of a triangle formed by the remaining three vertices $x_1$, $R_1$, and $x_2$. Referring specifically to FIG. 5C, a third reflection point $R_3$ can be calculated by reflecting the point $x_1$ of a further shrunk simplex tetrahedron 503 through a geometrical center of a triangle formed by the remaining three vertices $R_1$, $R_2$, and $x_2$. As a result, a smaller simplex tetrahedron 504 is formed, containing therein the target control point 330. The process can be repeated to shrink the smaller simplex tetrahedron 504 even further, thereby finding the target control point 330 with a better precision.

Figure 4A:
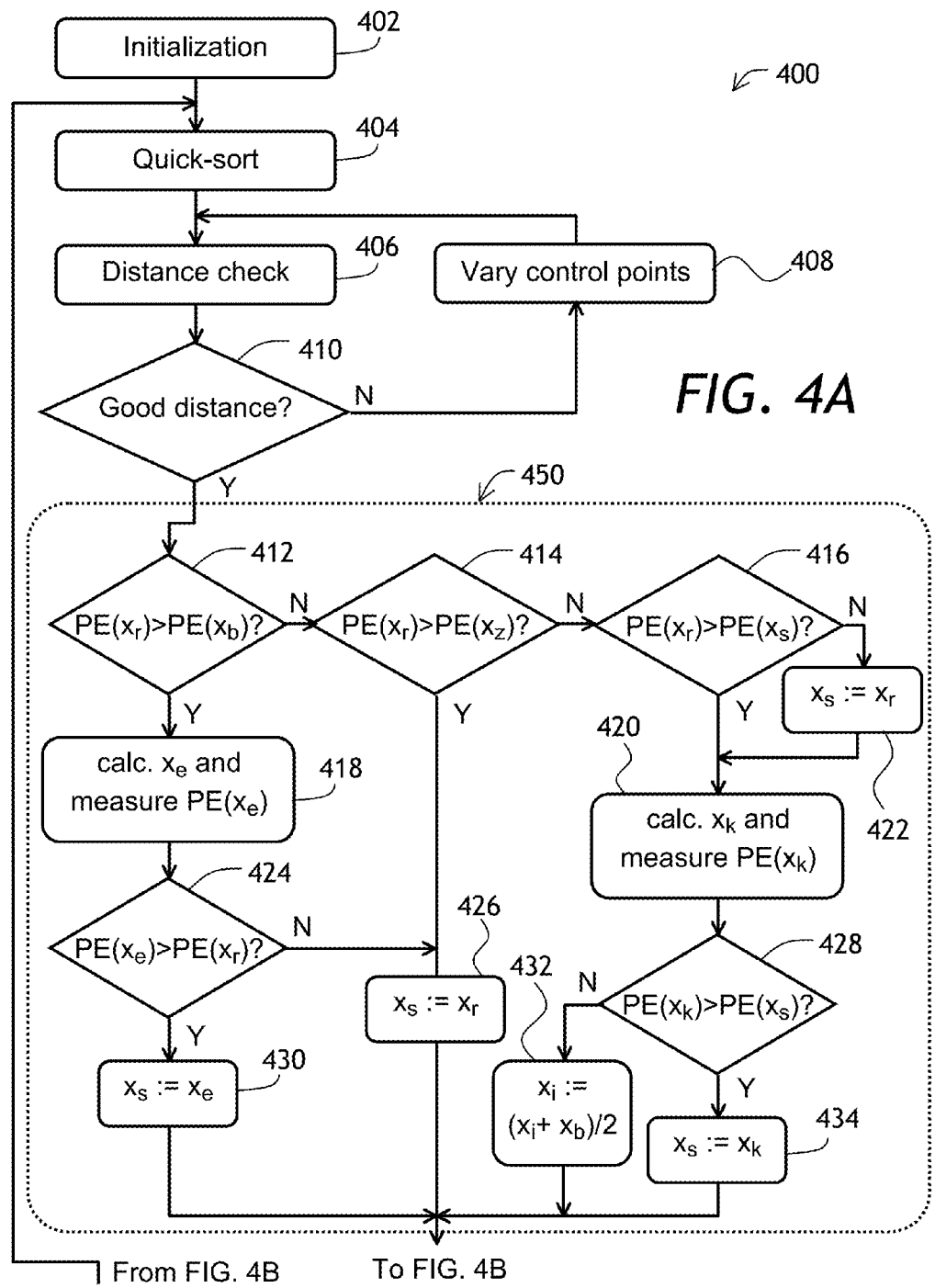
FIGS. 4A and 4B are consecutive sections of a flow chart of an exemplary method of measuring OSNR with the device of FIG. 1, using a Nelder-Mead search.
Figure 4B:
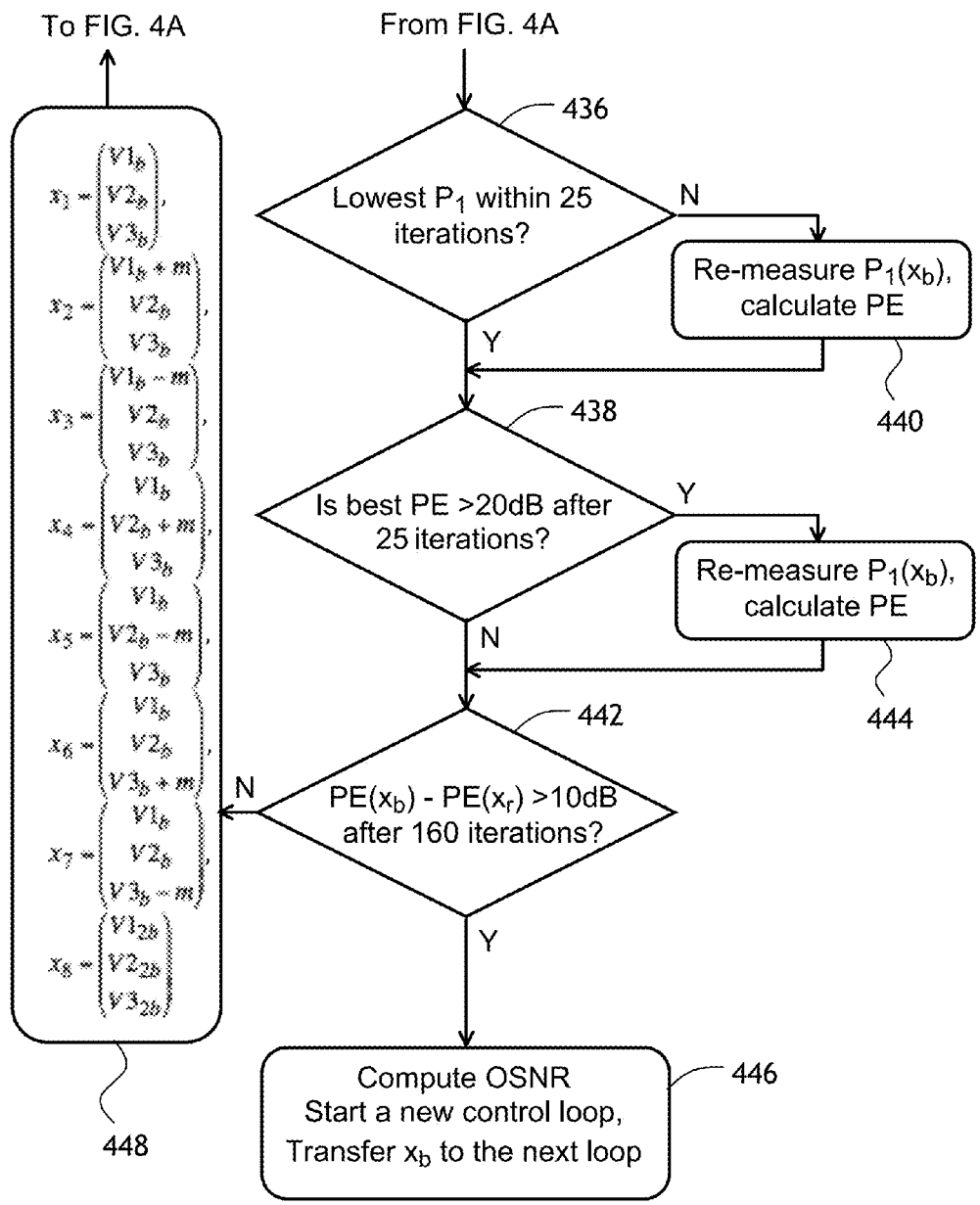

Referring specifically to FIG. 4B, a number of checks is performed in the method 400 to make sure that the Nelder-Mead search 450 does not get stuck on some secondary maximum or otherwise lacks progress in finding the target point 330. Specifically, in a step 436, a check is performed if the target control point 330 is reached during a pre-defined number of iterations of the Nelder-Mead search 450. For example, a check can be performed whether the lowest first optical power level $P_1$ is obtained within 25 latest iterations. If not, then in a step 440 the first optical power level $P_1$ is re-measured at the current best control point $x_b$. Then, in a step 438, a check is performed if the PE at the target control point 330 is higher than a pre-defined threshold value. The check 436 is performed periodically, after a pre-defined number of iterations. For example, the check 436 can be performed every 25 iterations whether the current best PE is larger than 20 dB. If yes, then in a step 444, the current best PE is re-evaluated by first measuring $P_1(x_b)$ and then calculating the PE=$P_1(x_b)/P_2(x_b)$.

In a step 442, a check is performed whether a difference between PE at a current best point $x_b$ and at a reflection point $x_e$ of the current best point $x_b$ is larger than a pre-defined threshold, e.g. 10 dB. The check 442 is performed after a pre-defined number of iterations, e.g. 160 iterations. The check 442 is performed to make sure that the currently found point provides PE values that are sufficiently higher than neighboring values. If yes, then in a step 446 the current best point $x_b$ is used as the target control point 330 for computing the OSNR, and a new control loop is started, the current best point $x_b$ being transferred to the new loop. If not, then the search is considered to have failed, and a new set of starting points is generated in a step 448. The new set of starting points is preferably generated using the following equations (1) to (8):

$$x_1 = \begin{pmatrix} V1_b \\ V2_b \\ V3_b \end{pmatrix} \quad (1)$$

$$x_2 = \begin{pmatrix} V1_b + m \\ V2_b \\ V3_b \end{pmatrix} \quad (2)$$

$$x_3 = \begin{pmatrix} V1_b - m \\ V2_b \\ V3_b \end{pmatrix} \quad (3)$$

$$x_4 = \begin{pmatrix} V1_b \\ V2_b + m \\ V3_b \end{pmatrix} \quad (4)$$

$$x_5 = \begin{pmatrix} V1_b \\ V2_b - m \\ V3_b \end{pmatrix} \quad (5)$$

$$x_6 = \begin{pmatrix} V1_b \\ V2_b \\ V3_b + m \end{pmatrix} \quad (6)$$

$$x_7 = \begin{pmatrix} V1_b \\ V2_b \\ V3_b - m \end{pmatrix}, \text{ and} \quad (7)$$

$$x_8 = \begin{pmatrix} V1_{2b} \\ V2_{2b} \\ V3_{2b} \end{pmatrix} \quad (8)$$

wherein $V1_b$, $V2_b$, and $V3_b$ are coordinates (that is, voltages, see FIG. 3A) of the current best point; $V1_{2b}$, $V2_{2b}$, and $V3_{2b}$ are coordinates of a current second best point; and m is a parameter. Preferably, the parameter m is selected dynamically, depending on the PE at the best point $x_b$. The higher the PE at the best point $x_b$, the smaller the selected parameter m.

After the new set of starting points $x_1$ to $x_8$ is generated in the step 448, the quick-sorting step 404 (FIG. 4A) is performed for the next, second iteration, and the whole process 400 repeats.

Figure 6:
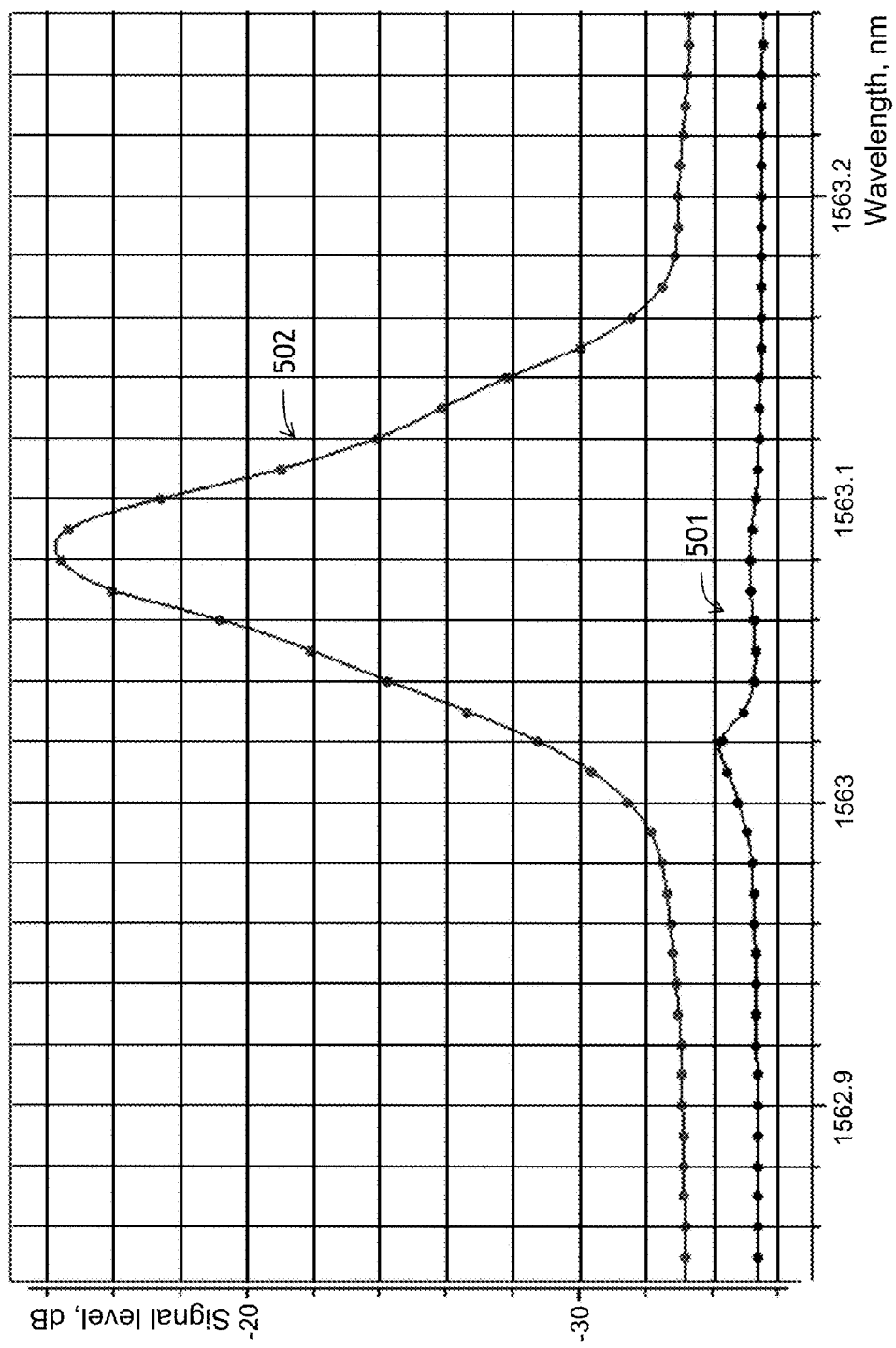
FIG. 6 is a spectral plot of first and second optical power levels detected by the device of FIG. 1.

Turning now to FIG. 6 with further reference to FIG. 1, spectral plots 601 and 602 of first $P_1$ and second $P_2$ optical power levels are shown, respectively. The first $P_1$ and second $P_2$ optical power levels have been detected by the device 100 of FIG. 1 in two consecutive scans of the tunable optical filter 108 across the spectrum of the selected wavelength channel 105, at two different states of the optical switch 109. The polarization nulling time in this example was much shorter than the scan time, allowing the polarization nulling 400 to arrive at the target control point for each wavelength of the scanned spectrum 501, that is, in real time. During the second scan, the polarization nulling was switched off, the optical switch 109 directing the optical signal for measurement of the second optical power $P_2$. The PE values of up to 24 dB were thus measured for the selected wavelength channel 105. Alternatively, if the second photodetector 122 is provided in the device 100, the optical switch 109 is not required, and both optical power levels $P_1$ and $P_3$ can be measured during a single scan of the spectrum by the tunable optical filter 108. The tunable filter 108 can include a diffraction grating based optical spectrum analyzer, a tunable Fabry-Perot etalon filter, and the like. The polarization controller 110 can include more than the minimal needed amount of stages, for "endless" polarization control. Rotatable waveplate controllers, fiber squeezing controllers, and other types of polarization controllers may be used. The minimal number of stages depends on the technology used.

Furthermore, elements of an optical train including the tunable optical filter 108, the polarization controller 110, the polarization selector 112, and the first photodetector 121 can be switched, as long as the polarization selector 112 is disposed downstream of the polarization controller 110, and the first photodetector 121 is disposed in the optical train downstream of the tunable optical filter 108, the polarization controller 110, and the polarization selector 112. For example, the polarization controller can be the first element in the optical train disposed upstream of the tunable optical filter 108.

A general method of measuring OSNR of the WDM optical signal 102 can thus include (a) coupling the WDM optical signal 102 to the optical train of the device 100, (b) tuning the optical filter 108 to the selected wavelength channel 105, (c) adjusting the polarization controller 110 to reach the target control point 330, and (d) computing the OSNR of the selected wavelength channel 105 from the measured PE. Step (c) includes using the control unit 118 to automatically perform the heuristic iterative search 200 or 400 of the target control point, by performing a plurality of iterations as explained above.

Preferably, step (b) includes continuously scanning the tunable optical filter 108, and step (c) includes continuously adjusting the polarization controller 110 to reach the target control point 330 for each wavelength channel scanned. Further, preferably, the heuristic iterative search 400 comprises the Nelder-Mead search 450, in which the plurality of control points of the first and second iterations form first and second Nelder-Mead simplexes, respectively, in the parameter space 304 of the polarization controller 110. As explained above with reference to FIGS. 4A and 4B, the step of adjusting polarization can include computing, after a pre-defined number of iterations of the Nelder-Mead search, a difference between polarization extinction values at a current best point and at a reflection point of the current best point, and using the current best point as the selected control point for computing the OSNR when the difference is larger than a pre-defined amount.

The hardware used to implement the various illustrative logics, logical blocks, modules, and circuits described in connection with the aspects disclosed herein, e.g. the controller 118 of FIG. 1, may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A device to determine optical signal-to-noise ratio (OSNR) of a wavelength division multiplexing (WDM) optical signal including a plurality of optical wavelength channels, the device comprising:
    a tunable optical filter to select an optical wavelength channel of the plurality of optical wavelength channels;
    a polarization controller to adjust a polarization state of the selected optical wavelength channel; and
    a control unit to iteratively search for a target control point of the polarization controller wherein a first optical power level of the selected optical wavelength channel is minimized, and to compute the OSNR of the selected optical wavelength channel based on the target control point, wherein the iterative search for the target control point comprises:
        determining initial control points and optical power measurements for the initial control points in a first iteration;
        determining a plurality of control points in a second iteration based on the optical power measurements determined for the initial control points; and
        determining the target control point based on optical power measurements determined for the plurality of control points.

2. The device of claim 1, wherein the OSNR is computed from a polarization extinction determined according to a ratio of a second optical power level to the first optical power level at the target control point, wherein the second optical power is of the selected optical wavelength channel bypassing the polarization controller.

3. The device of claim 2, comprising an optical switch controllable to bypass the polarization controller and couple the tunable optical filter directly to a photodetector to measure the second optical power.

4. The device of claim 1, wherein the iterative search comprises a Nelder-Mead search, and the plurality of control points form Nelder-Mead simplexes in a parameter space of the polarization controller.

5. The device of claim 1, wherein the control unit is to perform the iterative search for each wavelength channel of the plurality of wavelength channels during a single scan of all of the plurality of wavelength channels.

6. The device of claim 5, wherein the control unit is to adjust the polarization controller to reach the target control point for each wavelength channel.

7. The device of claim 1, wherein the control unit is to determine if the target control point is reached at or prior to a maximum number of iterations of the iterative search, and, if not, to re-measure the first optical power level to determine the target control point.

8. The device of claim 7, wherein the control unit is to periodically determine if a polarization extinction at the target control point is higher than a threshold value, and if yes, to re-measure the first optical power level at the target control point.

9. The device of claim 8, wherein the threshold value is at least 20 dB, or wherein the maximum number of iterations is 25 iterations.

10. A device to determine OSNR of an optical signal comprising a plurality of optical wavelength channels, the device comprising:
    a tunable optical filter to select an optical wavelength channel of the plurality of optical wavelength channels;

a polarization controller to adjust a polarization state of the selected optical wavelength channel; and a control unit to perform a scan of all the plurality of optical wavelength channels, wherein during the scan, the control unit is to, for each of the plurality of optical wavelength channels:

tune the tunable optical filter to the optical wavelength channel;

iteratively search for a target control point of the polarization controller wherein a first optical power level of the optical wavelength channel is minimized, wherein the iterative search comprises:

determining initial control points and optical power measurements for the initial control points in a first iteration;

determining a plurality of control points in a second iteration based on the optical power measurements determined for the initial control points; and determining the target control point based on optical power measurements determined for the plurality of control points; and compute the OSNR of the optical wavelength channel based on the target control point.

11. The device of claim 10, wherein the iterative search comprises controlling the polarization controller to perform a plurality of adjustments of the polarization state of the optical wavelength channel and determine the first optical power level for each adjustment to identify the target control point wherein the first optical power level is minimized.

12. The device of claim 11, wherein, for each of the plurality of optical wavelength channels, the OSNR is computed from a polarization extinction determined according to a ratio of a second optical power level to the first optical power level at the target control point, wherein the second optical power is of the optical wavelength channel bypassing the polarization controller.

13. A method of determining OSNR of an optical signal including a plurality of optical wavelength channels, the method comprising:

selecting an optical wavelength channel of the plurality of optical wavelength channels;

iteratively searching for a polarization state of the selected optical wavelength channel wherein a first optical power level of the selected optical wavelength channel is minimized, wherein the iterative search comprises:

determining initial polarization states and optical power measurements for the initial polarization states in a first iteration;

determining a plurality of polarization states in a second iteration based on the optical power measurements determined for the initial polarization states; and determining the polarization state wherein the first optical power level is minimized based on optical power measurements determined for the plurality of polarization states; and computing the OSNR of the selected wavelength channel based on the polarization state wherein the first optical power level of the selected optical wavelength channel is minimized.

14. The method of claim 13, wherein computing the OSNR comprises:

determining the OSNR from a polarization extinction computed according to a ratio of a second optical power level to the first optical power level, wherein the second optical power is a measure of the optical power of the selected optical wavelength channel without the selected optical wavelength channel passing through the polarization controller.

15. The method of claim 13, comprising performing the iterative search for each wavelength channel of the plurality of wavelength channels during a single scan of all of the plurality of optical wavelength channels.

* * * * *